Dec. 8, 1970  C. BERGER  3,546,020
REGENERABLE FUEL CELL
Filed May 9, 1966  2 Sheets-Sheet 1
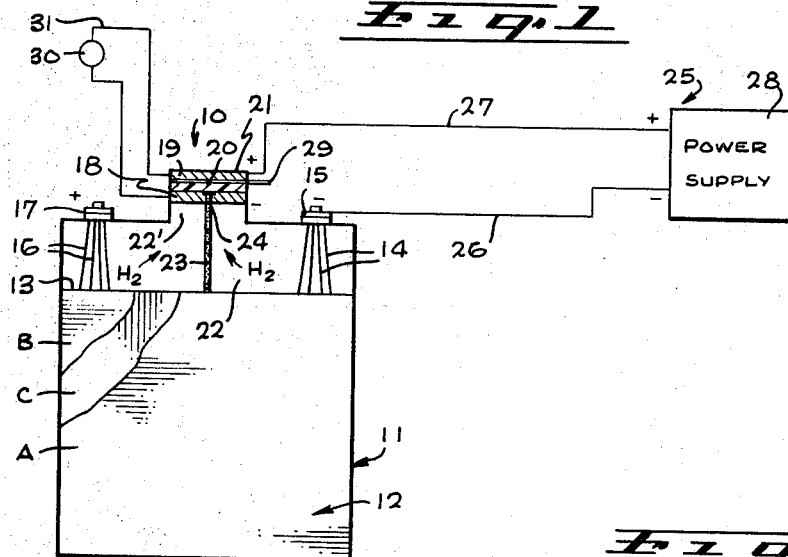
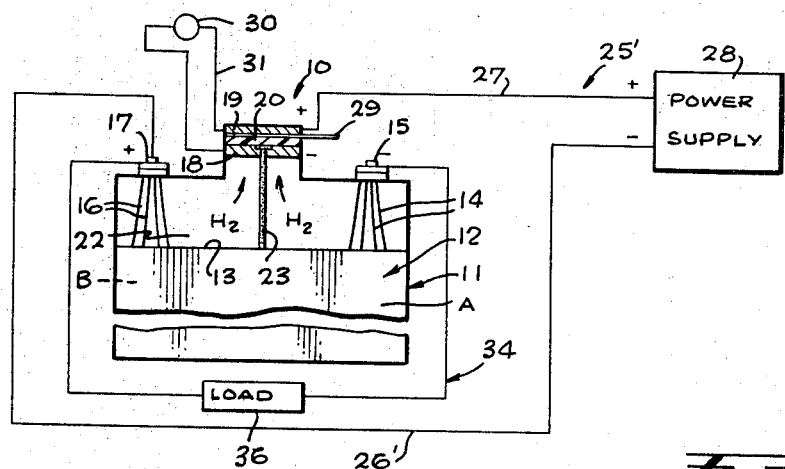
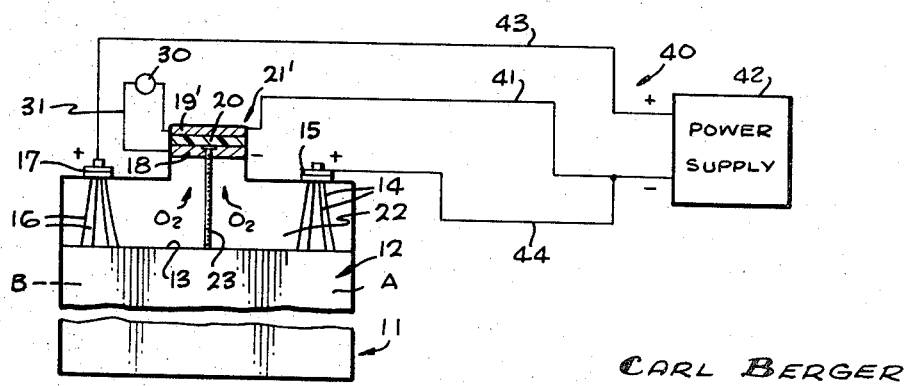
CARL BERGER
INVENTOR.
BY Max Gelden
ATTORNEY Dec. 8, 1970     C. BERGER     3,546,020
REGENERABLE FUEL CELL
Filed May 9, 1966     2 Sheets-Sheet 2
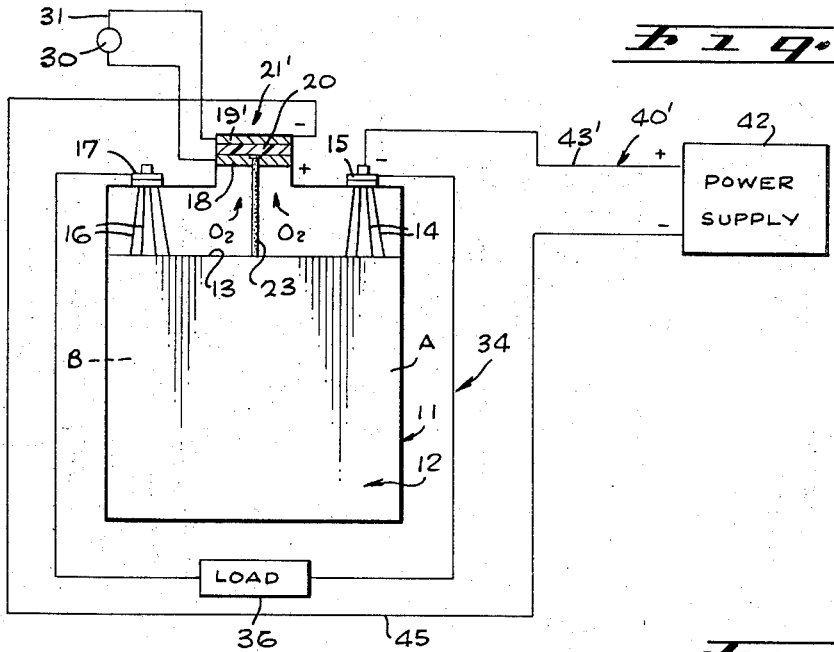
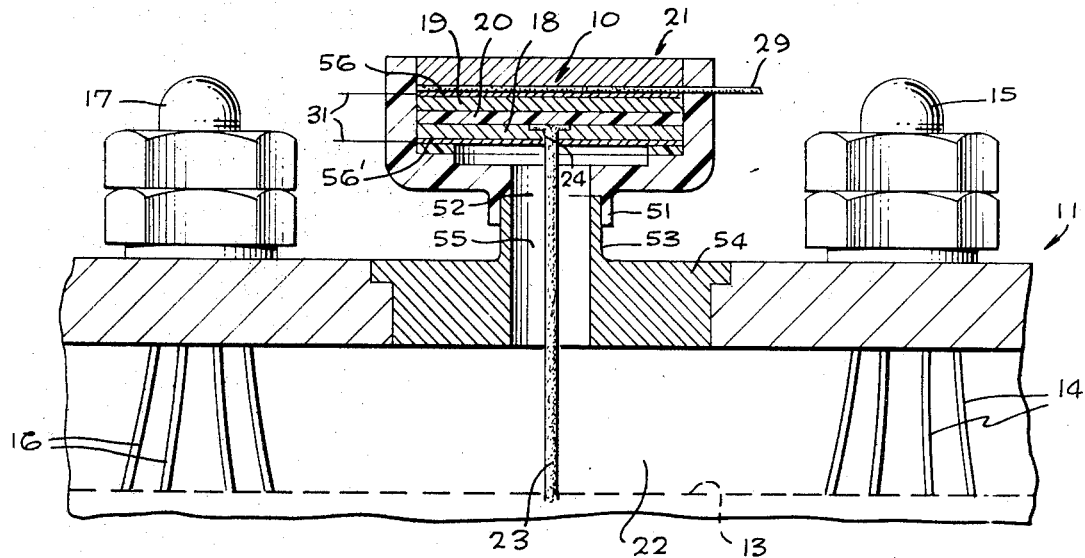
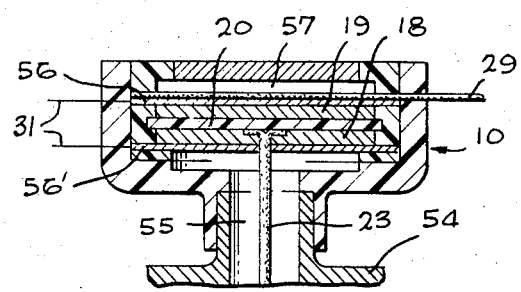
CARL BERGER
INVENTOR.
BY
ATTORNEY United States Patent Office 3,546,020
Patented Dec. 8, 1970

3,546,020
REGENERABLE FUEL CELL
Carl Berger, Santa Ana, Calif., assignor, by mesne assignments, to McDonnell Douglas Corporation, Santa Monica, Calif., a corporation of Maryland
Filed May 9, 1966, Ser. No. 548,591
Int. Cl. H01m 27/00
U.S. Cl. 136—86                           15 Claims

ABSTRACT OF THE DISCLOSURE

A rechargeable battery-fuel cell combination in which said fuel cell comprises wick means in contact with the electrolyte of said battery and functions as a sealing and pressure relief means.

---

This invention relates to a system for regenerating or recharging a fuel cell, and is particularly concerned with a system employing a fuel cell in combination with a battery for the elimination of dangerous pressures which are built up in batteries during operation thereof, and including means for regenerating or recharging the fuel cell when the fuel supply of the fuel cell required for reacting with the battery gases, becomes exhausted and the fuel cell stops functioning.

Batteries are an important source of energy storage for power generation. An important type of battery for this purpose is the conventional lead-acid storage battery. Other types of batteries which are becoming increasingly important, especially for use in air-borne systems, are the high energy density alkaline electrolyte cells using such electrode combinations as silver-zinc, silver-cadmium and nickel-cadmium. High energy density batteries are generally batteries which have a substantially higher energy per unit of weight than conventional, e.g., lead, storage batteries.

Most batteries of the above types generate gases, particularly during the charge cycle. If a sealed system is used, dangerous pressures can be developed and serious danger arises, such as battery damage or bursting and the formation of an explosive atmosphere resulting from the escaping gases. Such build-up of gas pressure in batteries is a well recognized phenomenon and various methods and systems have been devised in the prior art to meet this problem. However, all of these prior art systems for eliminating generated gases in a battery have certain disadvantages. Thus, for example, many of these systems are relatively complex and expensive and many are relatively inefficient.

According to the inventions described and claimed in my copending applications Ser. No. 395,681, filed Sept. 11, 1964, now abandoned in favor of copending continuation application Ser. No. 797,350, filed Jan. 24, 1969, and Ser. No. 495,865, filed Oct. 14, 1965, now abandoned in favor of copending continuation application Ser. No. 824,740, filed May 7, 1969, a fuel cell, preferably in the form of a miniature fuel cell, e.g., a hydrogen-oxygen fuel cell, is associated with and preferably mounted on a battery, such as a lead-acid storage battery or a high energy density battery such as a silver-zinc battery, to eliminate the build-up of high pressures within the battery caused by the generation therein of gases such as hydrogen or oxygen, e.g., during the charge cycle. When mounted in position on the battery, at least one of the fuel cell electrodes is in communication with the interior of the battery. Gases such as hydrogen generated in the battery pass from the electrode compartment in the interior of the battery into contact with an exposed electrode of the fuel cell, and such hydrogen is caused to react with a reducible oxidizer such as oxygen in the fuel cell to generate electricity. In such reaction water forms and such water can either be eliminated from the fuel cell or drawn back into the battery, thereby reducing all danger of the high pressure of the gases, particularly hydrogen, built up in such batteries. Reaction of the gases in the fuel cell, e.g., hydrogen and oxygen to form water, simultaneously generates an electric current which can be used to light a bulb or sound a buzzer to indicate such gas generation in the battery. Thus, these systems provide a device, that is, a fuel cell, which in combination with the battery functions to seal the battery.

In the systems described in my above copending applications and outlined above, it is necessary that a fuel, e.g., oxygen, be supplied or maintained in the fuel cell, in amounts sufficient to react with all of the battery gases, e.g., hydrogen, generated during charging or discharge of the battery. Thus, for example, where the fuel stored or supplied by the fuel cell is oxygen for reaction with hydrogen battery gases, the other electrode of the fuel cell which is not in communication with the interior of the battery and which is the oxygen electrode, can be in communication with a supply of oxygen gas which is furnished to the chamber adjacent such electrode. The oxygen electrode of such fuel cell is generally a catalyst electrode. However, in place of employing a catalyst electrode as the oxygen electrode, and as noted in my above copending application Ser. No. 495,865, an electrode formed of a cathodic depolarizer material, such as silver oxide, or of an anodic depolarizer material such as zinc, can be employed. When employing a silver oxide cathodic depolarizer as the oxygen electrode of such a fuel cell, during operation of the fuel cell a reduction of the silver oxide to silver occurs and the silver oxide accordingly functions both as the fuel to generate oxygen and the electrode, thereby eliminating the requirement for oxygen gas or a substance which generates oxygen to function as a fuel.

The fuel cell systems for eliminating gas pressure in batteries described in my above copending applications are highly effective. However, regardless of the manner in which the fuel, e.g., oxygen, is stored in or supplied to the fuel cell, e.g., for reaction with hydrogen battery gases, as when employing, for example, a silver oxide cathodic depolarizer for this purpose, if gassing of the battery is substantial, then the storable fuel supply of the fuel cell for reacting with the battery gases becomes exhausted and the fuel cell stops functioning.

It is accordingly the major object of this invention to provide a system and procedure to regenerate or recharge a fuel cell in a simple economical manner to regenerate the fuel for the fuel cell, and particularly to regenerate such fuel cell while it is in position and used for degassing a battery, e.g., a lead-acid storage battery or a high energy density battery such as a silver-zinc battery, which is sealed, without regenerating at the same time other gases such as the battery gas, e.g., hydrogen, which is being consumed by the fuel cell.

Other objects and advantages of the invention will appear hereinafter.

The above objects are accomplished according to the invention by regenerating the fuel for the fuel cell electrolytically, and particularly by regenerating electrolytically the fuel cell electrode which supplies such fuel. This is accomplished by providing a charge loop for the fuel cell between an electrode of the battery and an electrode of the fuel cell, that is, the regenerable electrode thereof, such circuit being completed through an electrolyte bridge, e.g., in the form of a wick, between the fuel cell and the battery. A power source is provided in such circuit to affect the electrolytic regeneration of the fuel cell, in the manner described in detail below.

Briefly, according to the invention there is provided in combination, a battery comprising two electrodes of opposite polarity and an electrolyte, and a fuel cell connected to the battery, said fuel cell comprising a first electrode, a regenerable electrode and an ion conducting material disposed between such fuel cell electrodes. Such first electrode of the fuel cell, e.g., in the form of a catalyst electrode, is in communication with the interior of the battery for passage of gas, e.g., hydrogen, generated in the battery, to such catalyst electrode, and means is provided for electrolytically connecting the regenerable electrode of the fuel cell to one of the battery electrodes via the battery electrolyte, e.g., by a wick means in electrical association or electrical contact at one end with the regenerable electrode of the fuel cell, and having its other end in contact with the battery electrolyte. Means is provided to electrically connect the regenerable fuel cell electrode and said one battery electrode externally of the battery to form an electrical circuit through the fuel cell and the battery, and including said two last mentioned electrodes. A power source to provide a D.C. current, such as a battery charger or a solar cell, is provided in the external circuit to regenerate the fuel cell, either during the charge cycle or the discharge cycle of the battery, or while the battery is on "stand," that is while the battery is neither being charged nor discharged. The regenerable electrode of the fuel cell and the battery electrode to which it is electrically connected have relative opposite polarity during the regeneration of the fuel cell.

During the regeneration or charging of a fuel cell through a circuit including one of the battery electrodes, e.g., the zinc electrode of a silver-zinc battery, and the regenerable electrode of the fuel cell, e.g., a silver oxide cathodic depolarizer electrode, since the fuel cell regenerating circuit is completed between the regenerable fuel cell electrode and one of the battery electrodes, and since the electrolytic reactions therefore take place at such electrodes, the other electrode of the fuel cell, e.g., the catalyst electrode with which the battery gases are in contact, remains inert, and does not generate battery gases such as hydrogen, which it is desired to consume by the fuel cell.

The term "regenerable electrode" employed in the specification and claims is intended to denote that electrode of the fuel cell which is not in communication with the battery gases generated by the battery, and which supplies the fuel, which may be oxygen or hydrogen, required for reaction with the battery gases in the fuel cell. Thus, the regenerable electrode as defined herein can be a conventional fuel cell catalyst electrode, e.g., platinum, whose composition per se does not change, but which by passage of current through the fuel cell generates a fuel such as oxygen gas or hydrogen gas which can be stored in a chamber adjacent to such electrode for supplying the fuel required to react with the battery gases when the fuel cell is being operated or discharged. However, the preferred regenerable electrode materials which are employed as the fuel generating electrode of the fuel cell which is not in communication with the battery gases, can be a battery type electrode in the form of a cathodic depolarizer material or an anodic depolarizer material. Examples of solid cathodic depolarizer materials which can be employed as the regenerable electrode of the fuel cell are silver oxide, copper oxide, cadmium oxide, nickel oxide and lead oxide. Examples of solid anodic depolarizer materials which can be employed as the regenerable electrode are metals such as zinc, cadmium and lead.

All of the above noted solid cathodic or anodic depolarizer materials for forming the regenerable electrode of the fuel cell are completely reversible so that the fuel cell incorporating such regenerable electrode, can be discharged and charged over a large number of discharge-charge cycles.

In place of a solid cathodic depolarizer or a solid anodic depolarizer, there may be employed as the regenerable electrode of the fuel cell a liquid cathodic depolarizer material such as nitrobenzene, or a liquid anodic depolarizer material such as a liquid hydrocarbon, aniline or hydrazine.

The invention will be more clearly understood by reference to the various embodiments thereof described below taken in connection with the accompanying drawing wherein:

FIG. 1 is a schematic representation of one embodiment of the invention illustrating a fuel cell mounted on a battery shown partly broken away, for sealing the battery and reducing gas pressure therein, and a system for recharging the fuel cell;

FIG. 2 shows a schematic representation of a system similar to that of FIG. 1, but wherein the fuel cell is charged via the battery cathode;

FIG. 3 is a schematic representation of a system similar to FIG. 1 but wherein recharging is accomplished through the fuel cell anode and the battery cathode;

FIG. 4 is a schematic representation of a system similar to FIG. 3, but wherein the recharging of the fuel cell anode is accomplished via the battery anode;

FIG. 5 shows a structural arrangement of a fuel cell mounted on a battery and incorporating the fuel cell recharging loop according to the invention, as illustrated in FIG. 1; and FIG. 6 illustrates a fuel cell construction similar to that shown in FIG. 5, but wherein the regenerable electrode of the fuel cell is a catalyst electrode and a fuel gas chamber is provided adjacent such catalyst electrode.

Referring now to FIG. 1 of the drawing, there is shown a fuel cell indicated at 10 mounted on a battery indicated at 11. Such battery can be lead-acid storage battery of conventional design including the conventional lead and lead oxide electrodes and acid, e.g., sulfuric acid, electrolyte. Alternatively, and in the embodiments specifically described herein, such battery can be a high energy density battery composed of a plurality of conventional zinc electrodes indicated at A, and silver electrodes indicated at B, with a suitable, e.g., inorganic, separator, indicated at C, positioned therebetween, such arrangement constituting a battery pack indicated generally by the numeral 12 and including a suitable electrolyte, such as an aqueous potassium hydroxide electrolyte, the surface of which is indicated at 13 in FIG. 1. A multiplate high energy density battery of this general type is described and claimed in the copending application of Albert Himy, Ser. No. 533,170, filed Mar. 10, 1966, now Pat. No. 3,369,937. The construction and composition of the above noted batteries forms no part of the instant invention. Hence, no further discussion of the construction of these batteries will be given in the instant application.

The lead wires 14 from the negative zinc electrodes A are connected to a terminal 15 constituting the battery anode, and the lead wires 16 from the silver electrodes B of the battery are connected to a terminal 17 constituting the battery cathode.

The fuel cell 10 comprises a platinum catalyst electrode 18 and a silver oxide cathodic depolarizer forming the cathode 19 of the fuel cell, with an electrode separating ion conducting membrane 20 which in the instant embodiment can be an organic cation exchanger cross-linked polystyrene plastic in a polypropylene or polyethylene medium, and marketed as an AMF-C314 membrane. Alternatively, membrane 20 can be KOH-impregnated asbestos. The components 18, 19 and 20 are suitably mounted in a case indicated at 21, and such case is mounted in suitable manner on the battery 11, with an opening 22' provided in the top of the battery and in communication with the interior of the fuel cell case 21, to permit battery gases from the electrode compartment 22 to communicate with and impinge upon the catalyst electrode 18. The construction of such fuel cell and its assembly on the battery are described more fully below in connection with FIG. 5 of the drawing.

An absorbent wicking member or wick 23 is provided which passes through a central opening 24 in the catalyst electrode 18, and has its upper end in contact with the ion conducting membrane or electrolyte member 20 of the fuel cell. The wick 23 is suitably supported in position and is suspended from the fuel cell 10, extending downwardly into the battery compartment 22 and having its lower end in contact with the battery electrolyte, e.g., aqueous potassium hydroxide, indicated at 13, and absorbing same. The lower end of the wick can be in contact with either free eletcrolyte solution, or in contact with a battery component such as the battery separator C containing absorbed electrolyte solution, in either case permitting absorption of the electrolyte by the wick. Such wicking element can be any porous material capable of absorbing water and electrolyte solutions. Such wicking materials can include, for example, porous sheets or tufting or felting formed from Orlon, Dacron, glass wool, cellulose acetate, and the like. An external electrical circuit indicated at 25 is formed between the battery anode terminal 15, connected to the zinc electrodes, and the regenerable electrode or silver oxide cathodic depolarizer 19 of the fuel cell 10. Such circuit includes the wires 26 and 27 connected to a D.C. power supply indicated at 28.

Assuming that the battery gases which accumulate in the electrical compartment 22 of the battery 11 are essentially hydrogen, and the fuel cell 10 is a hydrogen-oxygen fuel cell, the hydrogen which passes into contact with the catalyst electrode or anode 18 of the fuel cell via the passage 22', is oxidized to form hydrogen ion which migrates through the ion conducting membrane 20 and reacts with hydroxyl ion formed adjacent the cathodic depolarizer or silver oxide cathode 19 of the fuel cell, which hydroxyl ion is formed by reduction of such silver oxide depolarizer.

Water formed in the electrochemical reaction taking place in the fuel cell adjacent the cathodic depolarizer 19 can migrate through the ion conducting membrane 20 and is then drawn by capillary action through the wick 23 back to the battery electrolyte at 13. If desired, an additional wicking member 29 can be provided between the ion conducting membrane 20 and adjacent the cathodic depolarizer 19 and extending externally of the fuel cell to facilitate removal of water adjacent the cathodic depolarizer, from the fuel cell.

The electrical current generated in the fuel cell by the electrochemical reaction resulting from the consuming of the battery gases, can be passed to a load indicated at 30, through an electrical circuit indicated at 31 and connecting the fuel cell electrodes 18 and 19 to such load 30. Such load can be in the form of an electrical bulb giving a visual signal that gases are being generated in the battery, or load 30 can be in the form of a buzzer giving an auditory signal of the generation of gases in the battery 11.

Alternatively, the electrical output of the fuel cell can be channeled back into the battery 11 through the battery terminals 15 and 17 by connecting electrical leads (not shown) from the catalyst electrodes 18 and 19 to terminals 17 and 15 of the battery respectively.

Now assume that during charging of the battery 11 in the normal manner by connecting a D.C. power source or battery charger (not shown) to the battery terminals 15 and 17, the amount of hydrogen gases evolved during charging of the battery is such that the cathodic depolarizer 19 suplying the fuel, that is oxygen, for consuming such hydrogen gases, is depleted or is completely reduced to silver, and the fuel cell 10 accordingly stops functioning, as indicated by the absence of a visual or auditory load signal at 30. The circuit 25 including the power supply 28 therefor is now placed in operation to recharge or regenerate the cathodic depolarizer 19 so as to again supply fuel, that is basically a source of oxygen, for consuming the hydrogen battery gases. This is accomplished according to the invention by a charge loop through the battery by electrolytically connecting the spent cathodic depolarizer 19 via the electrolytic bridge or wick 23 and the electrolyte 13 of the battery to the zinc electrodes A of the battery pack 12, and from anode terminal 15 of the battery, completing the electrical circuit to fuel cell electrode 19 through the external circuit 25. During such charging operation the reduced silver of the spent cathode depolarizer 19 is oxidized to silver oxide to regenerate fuel cell electrode 19, and the spent zinc oxide electrodes A of the battery 11 are reduced to active zinc thus simultaneously regenerating the negative electrodes of the battery. During such charging operation, the catalyst electrode 18 of the fuel cell 10 remains functionless and inert, and does not generate any hydrogen, the battery gases desired to be consumed by the fuel cell. Also, it will be seen that the charging of the fuel cell according to the invention, also aids in charging or regenerating the zinc electrodes of the battery to convert same from zinc oxide to zinc.

The charging of the fuel cell as described above can take place simultaneously with normal charging of the battery.

Referring now to FIG. 2 of the drawing, there is shown a modification of the invention system of FIG. 1, and wherein the fuel cell cathodic silver oxide depolarizer 19 is recharged via the battery cathode 17. Thus, in the system of FIG. 2 the negative terminal of the battery power supply 28 is connected to the silver electrodes or cathodes B of the battery 11, via the silver or cathode terminal 17. However, in this embodiment, in order to obtain relative opposite polarity between the cathodic depolarizer 19 of the fuel cell and the cathode terminal 17 of the battery, the charging of the fuel cell 19 in FIG. 2 is carried out simultaneously with discharge of the battery through a circuit 34 which is connected to terminals 15 and 17, and including a load 36 in such circuit. Under these conditions, the silver oxide electrodes B of the battery are converted to silver, and the cathodic depolarizer 19 of the fuel cell is converted to silver oxide, thereby providing electrical connection between the chargable fuel cell electrode 19 and an electrode of dissimilar polarity 17 of the battery. The circuit for the system of FIG. 2 is thereby completed, during the discharge of the battery, from the power source 28 through the electrical connection 26' to the silver electrodes terminal 17 and the silver electrodes B, and then internally via the electrolyte 13 and the electrolytic bridge provided by the wick 23 and the electrolytic membrane 20 of the fuel cell, to the cathodic depolarizer or silver oxide cathode 19 of the fuel cell, and via the electrical connection 27 to the power supply 28.

In the embodiment of FIG. 2, although a portion of the battery power is being employed during charging of the fuel cell, this is balanced in large measure by the lower voltage requirement from the power supply 28 for recharging the fuel cell.

Now referring to FIG. 3 of the drawing, there is illustrated a system for recharging an oxygen consuming fuel cell in a battery, without generation of oxygen. In this embodiment, the fuel cell 21' has an anodic depolarizer in the form of a zinc electrode 19', and the battery gases generated are essentially oxygen. The oxygen generated in compartment 22 of the battery impinges against the platinized catalyst electrode 18, and the zinc electrode or anodic depolarizer 19' is oxidized to zinc oxide with loss of electrons, and the oxygen at the catalyst electrode 18 is reduced, forming water and generating a current which passes through an external load 30, as noted above with respect to FIG. 1. The wicking element 23 in FIG. 3, in addition to forming an electrolytic bridge for the charging circuit for the fuel cell, and which is in contact with the catalyst electrode 18, serves to drain water formed by the fuel cell reaction at the cathode 18, back into the battery.

In FIG. 3, an external circuit 40 is provided between the fuel cell anode 19' and the battery cathode terminal 17, wherein an electrical lead 41 connects the zinc anode 19' of the fuel cell with the negative terminal of a D.C. power supply 42, and an electrical lead 43 connects the cathode or silver terminal 17 of the battery with the positive terminal of the power supply 42. The circuit is completed internally from the silver electrodes or cathodes B of the battery through the electrolyte 13 and the electrolytic bridge provided by wick 23 and the ion conducting membrane 20 of the fuel cell to the fuel cell zinc anode 19'.

In the embodiment of FIG. 3, charging of the fuel cell 21' can take place simultaneously with the charging of the battery 11. This simultaneous charging of the battery and the fuel cell by the D.C. power source 42 can be accomplished by connecting a lead 44 between the zinc anode terminal 15 of the battery and the negative terminal of the power supply 42.

In FIG. 4 of the drawing there is shown a modification of the system of FIG. 3, and wherein the recharging of the fuel cell anodic depolarizer 19' of FIG. 1 is accomplished via the battery anode terminal 15. In the modification of FIG. 4, the positive terminal of the power supply 42 is connected via an electrical lead 43' to the zinc anode terminal 15 of the battery, and the negative terminal of the power supply is connected to the fuel cell anode 19' via lead 45.

As in the case of the modification of FIG. 2 above, in order that there be a difference in polarity between the zinc anodic depolarizer 19' of the fuel cell and the zinc electrodes or anodes A of the battery, it is necessary that during charging of the fuel cell 21' in FIG. 4, the battery be discharging to an external load 36 via the circuit 34 as in the case of FIG. 2. Thus, during charging of the fuel cell anode 19', zinc oxide is being converted to zinc, and simultaneously during discharge of the battery, the zinc electrodes A are being converted to zinc oxide, thus providing dissimilar polarities between anodic depolarizer 19' of the fuel cell and the zinc electrodes of the battery. Thus, the charging circuit for the fuel cell in FIG. 4 is completed externally through the circuit 40' and internally from the zinc electrodes A of the battery through the electrolyte 13 and the wick 23 and ion conducting membrane 20 of the fuel cell, to the zinc anodic depolarizer 19'.

During regeneration of the fuel cell in the embodiments of FIGS. 1 to 4, the fuel cell signal circuit 31 can remain closed, but preferably is open as by a suitable switch (not shown).

In the embodiments of FIGS. 1 and 3, for example, it will be understood that the fuel cell can be recharged while the battery is on "stand," that is, while the battery is neither being charged nor discharged.

In the embodiments of FIGS. 1 to 4 above, in place of the silver-zinc battery 11, the fuel cell principles of the invention can be applied to other high energy density batteries such as a silver-cadmium or a nickel-cadmium battery, or to the conventional lead-acid batteries employing lead and lead oxide electrodes. Thus, for example, battery 11 of FIGS. 1 to 4 can be a nickel-cadmium battery wherein electrodes A are nickel and electrodes B are cadmium and wherein the cathodic depolarizer 19 of the fuel cell 10 in FIGS. 1 and 2 can be nickel oxide, and the anodic depolarizer 19' of the fuel cell 21' in FIGS. 3 and 4 can be cadmium.

In these high energy density batteries (silver-zinc, silver-cadmium, nickel-cadmium), the electrolyte employed is an alkaline electrolyte, e.g., aqueous potassium hydroxide.

In the embodiments of FIGS. 1 to 4 where the battery 11 is a lead-acid storage battery, and wherein electrodes A are lead electrodes and electrodes B are lead oxide electrodes, the cathodic depolarizer 19 in FIGS. 1 and 2 can be lead oxide. and in the embodiments of FIGS. 3 and 4 the anodic depolarizer 19' of the fuel cell can be lead.

In FIG. 5 there is shown a structural arrangement for mounting a fuel cell such as fuel cell 10 of FIG. 1 on the battery 11. The fuel cell 10 is mounted within a case or adapter 21 formed of plastic material, e.g., Teflon, such adapter having a central depending flange 51 having a central opening 52 therein. The fuel cell 10 mounted within the casing 21 is press fitted over a central upwardly extending jack 53 formed on a fixture 54 on top of battery 11, and having an aligned central opening 55. Thus, when the fuel cell 10 is so mounted on the battery, gases in the electrode compartment 22 of the battery above the electrode plate and electrolyte level, indicated at 13, and generated in compartment 22 during charging, pass through openings 55 and 52, and into communication or contact with the fuel cell catalyst electrode 18. The wick 23, with its upper end adjacent the ion conducting member 20 of the fuel cell, is suspended from the fuel cell 10 down through openings 52 and 55, into the electrolyte compartment 22, with its lower end disposed in contact with the electrolyte at 13. The electrical leads 31 for the fuel cell circuit are connected to metal screens 56 and 56' in contact with the fuel cell electrodes 18 and 19.

In the embodiment of FIG. 6, there is shown a fuel cell similar to that shown in FIG. 5, except that a chamber 57 is provided above the regenerable electrode 19. In this modification, the regenerable electrode can be a platinum catalyst electrode similar to the catalyst electrode 18. Thus, for example, when a fuel cell of the type illustrated in FIG. 6 is employed for degassing a battery which generates hydrogen gas. a supply of oxygen fuel must be provided in the chamber 57. Such oxygen chamber of the fuel cell may be sealed, with oxgen supplied thereto or sealed therein for reaction with the generated hydrogen. Alternatively, the sealed oxygen chamber 57 can contain materials such as alkali metal chlorates, e.g., sodium chlorate, or alkali metal peroxide, e.g., sodium peroxide, which releases or generates the required oxygen.

When the supply of oxygen stored in or supplied to chamber 57 is exhausted, additional oxygen gas can be regenerated in the compartment 57 by the arrangement shown in FIG. 1 of the drawing. Thus, as the charging current from the power supply 28 is passed through the fuel cell, oxygen gases are generated adjacent the cathode catalyst electrode 19 and are stored in compartment 57, but without generating any hydrogen at the anode catalyst electrode 18.

However, the fuel cell system of FIG. 6 employing as the regenerable electrode 19, a catalyst electrode such as a platinum catalyst electrode, and wherein the fuel gas for reaction with the battery gases is generated adjacent such catalyst electrode, is not preferred. The fuel cells employing a solid cathodic or anodic depolarizer material as the regenerable electrode, are preferred for use in the invention system.

During periods of charging and discharging batteries, both hydrogen and oxygen may be generated simultaneously in the battery. Under these conditions, a single fuel cell prepared to remove only hydrogen, for example, may be inadequate to eliminate total gas pressure from the battery. a portion of which may be due to the generation of oxygen. To remove both hydrogen and oxygen from the battery simultaneously, a pair of fuel cells such as two fuel cells of the type illustrated in FIGS. 1 and 3 can be mounted individually on the battery in the manner described above and shown in the drawings, e.g., in FIG. 5, one being arranged so as to remove hydrogen from the battery, and being supplied with a cathodic depolarizer or a source of oxygen for this purpose, and the other being arranged to remove oxygen from the battery, and being supplied with an anodic depolarizer or with a source of hydrogen for this purpose. Further, a plurality of fuel cells can be mounted on the battery for removing hydrogen and/or a plurality of fuel cells can be mounted on the battery for removing oxygen.

A compact fuel cell unit can be provided composed of a pair of fuel cells separated by a gas impervious separator, each of the fuel cells having a catalyst electrode in communication with the battery gases, one of the fuel cells being supplied with a cathodic depolarizer electrode or source of oxygen to consume the hydrogen generated in the battery, and the other fuel cell being supplied with an anodic depolarizer electrode or a source of hydrogen to consume any of the oxygen generated in the battery. Such a duplex fuel cell arrangement is described in my above copending application Ser. No. 495,865.

In each of the above systems employing a plurality of fuel cells for consuming one or more gases generated by the battery, such fuel cells can be individually or collectively regenerated by employing the recharging or regenerating principles for the fuel cell described above.

Although the invention principles have been described above principally with respect to a hydrogen-oxygen fuel cell for use in conjunction with batteries such as lead-acid or high energy density batteries such as the silver-zinc, silver-cadmium, and nickel-cadmium batteries, which generate hydrogen and/or oxygen, it will be understood that the principles of the invention are equally applicable to fuel cells which operate on other gas systems such as, for example, chlorine-hydrogen, and oxygen-hydrocarbon, e.g., oxygen-methane fuel cells.

The ion conducting material of the fuel cell, i.e., member 20 in FIG. 1, can be any of the known types of materials employed for this purpose. In addition to a membrane composed of an organic ion conducting material such as the polystyrene type ion exchange membrane described above in connection with the systems shown in FIGS. 1 and 2 of the drawing, membranes can be utilized which are composed of capillary type materials containing an electrolyte which has ion conducting properties such as KOH-containing asbestos, and $H_3PO_4$ or $H_2SO_4$-containing asbestos membranes. Ion conducting membranes in the form of inorganic ion exchange membranes such as hydrous oxides of zirconium, titanium or bismuth, and zirconium phosphates can be employed, and filter paper impregnated with a suitable electrolyte. Hence, the term "ion conducting material" as employed in the specification and claims is intended to denote any of the types of materials noted above.

The electrode of the fuel cell, which is in communication with the battery gases, can be a catalyst electrode composed of any conventional catalyst material. Such materials include, in addition to platinum, catalyst materials such as palladium, iridium, nickel boride, cobalt boride, and the like.

During discharge of the batteries described above and illustrated in the drawing, as is well known, for example, the zinc is converted to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and cadmium" referring to the metals forming the respective electrodes of such battery systems, are intended to denote either the respective metals themselves or the corresponding oxides thereof.

From the foregoing, it is seen that the invention provides a novel system for recharging the fuel cell or the regenerable electrode thereof, used in conjunction with a sealed battery for eliminating gas pressure, particularly hydrogen and oxygen gas pressures, generated in a battery such as a lead-acid storage battery or a high energy density battery, e.g., a zinc silver-zinc battery, as described in my above copending applications. This is accomplished according to the invention by providing an electrical charge circuit which is completed from the regenerable electrode of the fuel cell through a battery electrode having relatively opposite polarity, via an electrolyte bridge from the fuel cell and through the electrolyte of the battery, to such battery electrode. As indicated from the description of the invention above and the various embodiments thereof in conjunction with the accompanying drawing, there are many variations which can be practiced according to the invention depending on whether mixed gases, e.g., both hydrogen and oxygen, are being generated and whether they are produced on the charge or discharge cycle. A primary feature of the invention is that current can be supplied or diverted from the battery to regenerate one or more fuel cells used for degassing the battery, on either the charge or discharge cycle of the battery, or while the battery is on stand, and for supplying the fuel in the form of either the reductant, e.g., oxygen, or the oxidant, e.g., hydrogen, depending upon the gases being generated by the battery.

The fuel cells employed for degassing a battery as described above, and which are regenerated according to the invention principles are generally of small size and termed "micro" fuel cells, although it will be understood that the invention principles are not limited with respect to fuel cell size.

It will be understood that various modifications and adaptations of the invention can be made by those skilled in the art without departing from the spirit of the invention, and accordingly the invention is not to be taken as limited except by the scope of the appended claims.

I claim:

1. In combination, a battery comprising at least two electrodes of opposite polarity and an electrolyte, sealing and pressure relief means for said battery, comprising a fuel cell connected to said battery and disposed externally of said battery electrolyte, said fuel cell comprising a first electrode, a regenerable electrode, and an ion conducting material disposed between said fuel cell electrodes, means communicating said first electrode of said fuel cell with the interior of said battery for passage of gas generated in said battery to said first electrode, means in contact with said electrolyte and extending externally of said electrolyte for electrolytically connecting said regenerable electrode of said fuel cell to one of said battery electrodes via the battery electrolyte, means electrically connecting said regenerable fuel cell electrode and said one battery electrode externally of said battery, to form an electrical circuit through said fuel cell and said battery, and including said two last mentioned electrodes, and means for supplying a direct current in said circuit.

2. A combination as defined in claim 1, wherein said first electrode of said fuel cell is a catalyst electrode and said regenerable electrode of said fuel cell is a cathodic depolarizer material selected from the group consisting of silver oxide, copper oxide, cadmium oxide, nickel oxide and lead oxide.

3. A combination as defined in claim 1, wherein said first electrode of said fuel cell is a catalyst electrode and said regenerable electrode of said fuel cell is an anodic depolarizer material selected from the group consisting of zinc, cadmium and lead.

4. A combination as defined in claim 1, wherein said battery is a silver-zinc battery and said regenerable electrode of said fuel cell is a silver oxide electrode.

5. A combination as defined in claim 1, wherein said battery is a silver-zinc battery and said regenerable electrode of said fuel cell is a zinc electrode.

6. A combination as defined in claim 1, wherein said electrolytically connecting means is a wick means connecting said regenerable fuel cell electrode and said electrolyte, and forming an electrolyte bridge between said fuel cell and said battery.

7. A combination as defined in claim 1, wherein said last mentioned means comprises a power source incorporated in the external portion of said circuit between said regenerable fuel cell electrode and said one battery electrode.

8. A combination as defined in claim 1, wherein said last mentioned means comprises a power source which is also connected in circuit with said battery electrodes and employed in charging the battery.

9. A combination as defined in claim 1, wherein said last mentioned means comprises means for supplying power derived from the battery during discharge thereof, in said circuit.

10. In combination, a battery containing an electrode compartment and at least two electrodes of opposite polarity and an electrolyte in said compartment, and which discharges at least one of the gases hydrogen and oxygen into said compartment during charging, sealing and pressure relief means for said battery comprising a hydrogen-oxygen fuel cell mounted on said battery and disposed externally of said battery electrolyte, said fuel cell comprising an ion conducting membrane, a catalyst electrode and a regenerable electrode positioned on opposite sides of said membrane, said catalyst electrode being in communication with said electrode compartment of said battery for passage of gas generated in said battery to said catalyst electrode, wick means in electrical contact with said regenerable electrode and in contact with electrolyte in said battery, forming an electrolytic bridge between said fuel cell and said battery, means electrically connecting said regenerable fuel cell electrode and one of said battery electrodes externally of said battery, to form an electrical circuit including said two last mentioned electrodes, said one battery electrode having a polarity opposite to that of said regenerable electrode, and means for supplying a direct current in said circuit.

11. A combination as defined in claim 10, wherein said battery is a silver zinc battery, said regenerable electrode of said fuel cell is a silver oxide electrode, and said one electrode of said battery is the zinc electrode thereof, said silver oxide fuel cell electrode and said zinc electrode of said battery being electrically connected to form said electrical circuit.

12. A combination as defined in claim 10, wherein said battery is a silver-zinc battery, said regenerable electrode of said fuel cell is a zinc electrode, and said one electrode of said battery is the silver electrode thereof, said zinc fuel cell electrode and said silver electrode of said battery being electrically connected to form said electrical circuit.

13. A method for regenerating a fuel cell employed for degassing a battery, said battery comprising at least two electrodes of opposite polarity and an electrolyte, said fuel cell disposed externally of said battery electrolyte and comprising a first electrode and a regenerable electrode, which comprises forming an electrolytic bridge between said regenerable electrode of said fuel cell and an electrode of said battery, via the battery electrolyte, forming an external electrical connection between said two last mentioned electrodes, to provide a closed electrical loop through said fuel cell and battery, and including said electrodes, and passing a direct current through said loop to regenerate said regenerable fuel cell electrode.

14. A method as defined in claim 13, wherein said battery is a silver-zinc battery and said regenerable electrode is a silver oxide electrode, and said electrolytic bridge is formed between said silver oxide regenerable electrode of the fuel cell, and one of said zinc and silver electrodes of said battery, said electrolytic bridge being in the form of a wick in electrical contact at one end with said regenerable electrode, and at the other end with the battery electrolyte, said wick absorbing said electrolyte.

15. A method as defined in claim 13, wherein said battery is a silver-zinc battery and said regenerable electrode is a zinc electrode, and said electrolytic bridge is formed between said zinc regenerable electrode of the fuel cell, and one of said zinc and silver electrodes of said battery, said electrolytic bridge being in the form of a wick in electrical contact at one end with said regenerable electrode, and at the other end with the battery electrolyte, said wick absorbing said electrolyte.

References Cited
UNITED STATES PATENTS

| | | | |
|---|---|---|---|
| 3,338,746 | 8/1967 | Plust et al. | 136—86 |
| 3,264,139 | 8/1966 | Solomon et al. | 136—6X |
| 3,005,943 | 10/1961 | Jaffe | 320—13 |
| 3,080,440 | 3/1963 | Ruetschi et al. | 136—86 |
| 2,925,455 | 2/1960 | Eidensohn et al. | 136—86 |

WINSTON A. DOUGLAS, Primary Examiner

H. A. FEELEY, Assistant Examiner